United States Patent Office 3,799,786
Patented Mar. 26, 1974

3,799,786
CROSSLINKABLE POLYMER COMPOSITIONS UTILIZING N-HETEROCYCLIC COMPOUNDS WITH CLEAVABLE OXY SUBSTITUENTS
Philip W. Jenkins, Donald W. Heseltine, and John D. Mee, Rochester, N.Y., assignors to Eastman Kodak Company, Rochester, N.Y.
No Drawing. Application Mar. 18, 1971, Ser. No. 125,834, now Patent No. 3,699,025, dated Oct. 17, 1972, which is a division of application Ser. No. 766,288, Oct. 9, 1968, now Patent No. 3,615,453, dated Oct. 26, 1971. Divided and this application May 17, 1972, Ser. No. 254,277
Int. Cl. G03c 5/30, 1/06; C09d 3/04
U.S. Cl. 106—125        15 Claims

ABSTRACT OF THE DISCLOSURE

Energy-sensitive compounds containing a heterocyclic nitrogen atom substituted with an —OR group are crosslinking agents for polymers having hardenable groups.

---

This application is a division of my earlier filed application Ser. No. 125,834, filed Mar. 18, 1971, now Pat. No. 3,699,025, issued Oct. 17, 1972, which is in turn a division of my earlier filed application Ser. No. 766,288, filed Oct. 9, 1968, now Pat. No. 3,615,453, issued Oct. 26, 1971.

This invention relates to crosslinkable polymer compositions.

Many polymers are crosslinkable. Some crosslink without the addition of an initiator while others require a crosslinking agent. A typical crosslinking agent is formaldehyde. Frequently, crosslinking occurs immediately on the addition of the crosslinking agent. When crosslinking takes place in this manner, the entire polymer is crosslinked, i.e., in those areas of the polymer which contain the crosslinking agent. In those cases where crosslinking does not occur merely by adding the crosslinking agent, additional energy such as light or heat is necessary to initiate the reaction. It is this latter system which is most useful in the photographic area. The crosslinked polymer being harder and more insoluble than the uncrosslinked material, generally can be separated from the uncrosslinked material by treating the polymer with a solvent for the uncrosslinked polymer. Thus, when a photographic element containing a layer of the crosslinkable polymer having a crosslinking agent uniformly distributed throughout, is subjected to a pattern of activating radiation such as light or heat, the polymer is hardened in the radiation struck areas and an image can be produced merely by washing as explained previously.

It is an object of this invention to provide a novel crosslinkable composition containing a polymer and a novel crosslinking agent.

This and other objects are accomplished with crosslinkable compositions comprising a polymer having hardenable groups and a dye crosslinking agent capable of being activated by heat, pressure or radiation having one of the following structures:

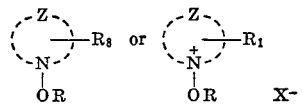

wherein:

(A) $R_1$ can be any of the following:

(a) a methine linkage terminated by a heterocyclic nucleus of the type contained in cyanine dyes, e.g., those set forth in Mees and James "The Theory of the Photographic Process," Macmillian, 3rd ed., pp. 198–232; the methine linkage can be substituted or unsubstituted, e.g., —CH=, —C(CH$_3$)=,

—CH=CH—CH=, etc.;
(b) an alkyl radical preferably containing 1 to 8 carbon atoms including a substituted alkyl radical;
(c) an aryl radical including a substituted aryl radical such as a phenyl radical, a naphthyl radical, a tolyl radical, etc.;
(d) a hydrogen atom;
(e) an acyl radical having the formula

wherein R is hydrogen or an alkyl group perferably having 1 to 8 carbon atoms;
(f) an anilinovinyl radical having the formula

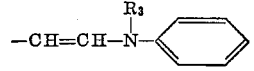

wherein $R_3$ is hydrogen or alkyl; or
(g) a styryl radical including substituted styryl radicals, e.g.,

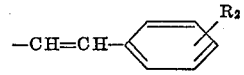

wherein $R_2$ is hydrogen, alkyl, aryl, amino including dialkylamino such as dimethylamino;

(B) R can be either (a) an alkyl radical preferably having 1 to 8 carbon atoms such as methyl, ethyl, butyl, etc., including a substituted alkyl radical such as sulfoalkyl, e.g., —CH$_2$SO$_3$—, an aralkyl, e.g., benzyl or pyridinatooxyalkyl salt, e.g., —(CH$_2$)$_3$—O—Y wherein Y is a substituted or unsubstituted pyridinium salt; or
(b) an acyl radical e.g.,

wherein $R_6$ is an alkyl radical preferably having 1 to 8 carbon atoms or aryl radical, e.g., methyl, ethyl, propyl, butyl, phenyl, naphthyl, etc.;

(C) Z represents the atoms necessary to complete a 5 to 6 membered heterocyclic nucleus including a substituted heterocyclic nucleus which nucleus can contain at least one additional hetero atom such as oxygen, sulfur, selenium or nitrogen, e.g., a pyridine nucleus, a quinoline nucleus, etc.;

(D) $R_8$ can be either of the following:

(a) a methine linkage terminated by a heterocyclic nucleus of the type contained in merocyanine dyes, e.g., those set forth in Mees and James (cited above); the methine linkage can be substituted or unsubstituted; or
(b) an allylidene radical including a substituted allylidene radical such as a dicyanoallylidene radical, an alkylcarboxyallylidine radical or an alkylsulfonylallylidene radical; and (E) X represents an acid anion, e.g., chloride, bromide, iodide, perchlorate, sulfamate, thiocyanate, p-toluenesulfonate, methyl sulfate, tetrafluoroborate, etc.

When these compounds are exposed to electromagnetic radiation, they are decomposed by a heterolytic cleavage of the nitrogen-oxygen (N—O) bond to produce a RO$^+$ ion, a dye base and an acid anion. The RO$^+$ ion may be decomposed even further producing an aldehyde and H$^+$ ion. The aldehyde is itself a crosslinking agent and causes crosslinking to occur in those areas of polymer with which it is in contact. The particular route of the fragmentation reaction is somewhat dependent upon the structure of the original compound. However, based upon observations, it is believed that the route followed by most of the dyes of this invention (such as the one given below) when exposed to electromagnetic radiation (such as light) is the following:

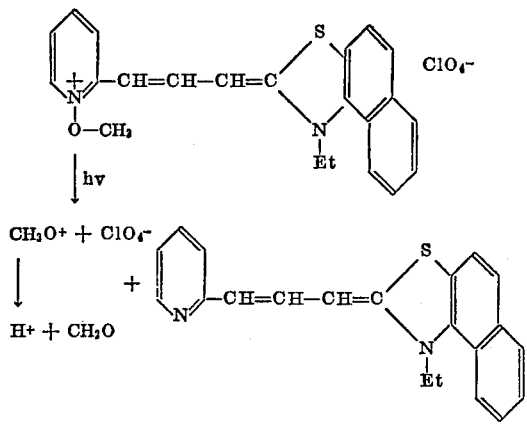

Compounds with an ionic or cationic group attached, when fragmented by energy, produce an aldehyde with a potential mordanting group. These compounds permit the crosslinked polymer to be easily dyed with conventional cationic or anionic dyes, the compounds upon decomposition simultaneously causing crosslinking and the attachment of a mordanting group to the polymer. A typical compound designed to produce an anionic mordant is set forth below together with the fragmentation reaction.

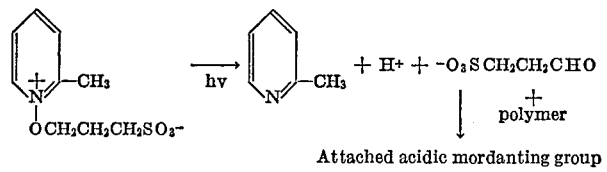

Such a mordant makes the polymer receptive to cationic dyes such as methylene blue. Cationic mordants can also be formed from the novel initiators of this invention. A typical compound and reaction are the following:

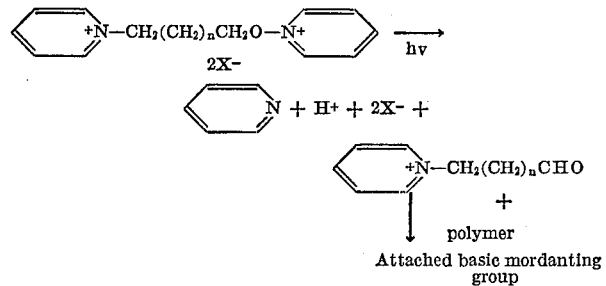

Mordants of this type render the polymer receptive to anionic dyes.

The preferred photochemical cross-linking initiating dyes capable of being activated by heat, pressure or radiation of this invention have one of the following structures:

(A)
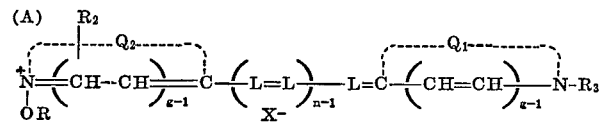

(B)
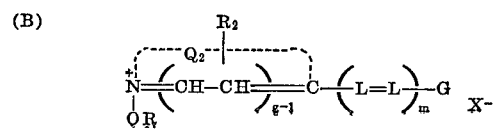

(C)
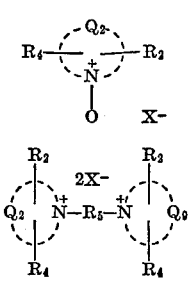

(D)

$Q_1$, $Q_2$, and $Q_9$ each represent the nonmetallic atoms necessary to complete a sensitizing or desensitizing nucleus containing from 5 to 6 atoms in the heterocyclic ring, which nucleus may contain a second hetero atom such as oxygen, sulfur, selenium or nitrogen, i.e., a nucleus of the type used in the production of cyanine dyes, such as the following representative nuclei: a thiazole nucleus, e.g., thiazole, 4-methylthiazole, 3-ethylthiazole, 4-phenylthiazole, 5-methylthiazole, 5-phenylthiazole, 4,5-dimethylthiazole, 4,5 - diphenylthiazole, 4 - (2 - thienyl) thiazole, 4 - chlorobenzothiazole, 4- or 5 - nitrobenzothiazole 5 - chlorobenzothiazole, 6 - chlorobenzothiazole, 7-chlorobenzothiazole, 4-methylbenzothiazole, 5-methylbenzothiazole, 6 -methylbenzothiazole, 6 - nitrobenzothiazole, 5 - bromobenzothiazole, 6 - bromobenzothiazole, 5-chloro-6-nitrobenzothiazole, 4-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6 - dimethoxybenzothiazole, 5,6 - dioxymethylenebenzothiazole, 5-hydroxybenzothiazole, 6-hydroxybenzothiazole, α - naphthothiazole, β - naphthothiazole, β,β-naphthothiazole, 5-methoxy-β,β-naphthothiazole, 5-ethoxy-β-naphthothiazole, 8-methoxy-α-naphthothiazole, 7-methoxy-α-naphthothiazole, 4'-methoxythianaphtheno-7',6',4,5-thiazole, nitro group substituted naphthothiazoles, etc.; an oxazole nucleus, e.g., 4-methyloxazole, 4-nitro-oxazole, 5-methyloxazole, 4-phenyloxazole, 4,5-diphenyloxazole, 4 - ethyloxazole, 4,5 - dimethoxazole, 5 - phenyloxazole, benzoxazole, 5 - chlorobenzoxazole, 5-methylbenzoxazole, 5-phenylbenzoxazole, 5- or 6-nitrobenzoxazole, 5-chloro-6-nitrobenzoxazole, 6-methylbenzoxazole, 5,6-dimethylbenzoxazole, 4,6-dimethylbenzoxazole, 5 - methoxybenzoxazole, 5 - ethoxybenzoxazole, 5-chlorobenzoxazole, 6-methoxybenzoxazole, 5-hydroxybenzoxazole, 6 - hydroxybenzoxazole, α - naphthoxazole, β-naphthoxazole, nitro group substituted naphthoxazoles, etc.; a selenazole nucleus, e.g., 4-methylselenazole, 4-nitroselenazole, 4-phenylselenazole, benzoselenazole, 5 - chlorobenzoselenazole, 5 - methoxybenzoselenazole, 5-hydroxybenzoselenazole, 5- or 6-nitrobenzoselenazole, 5-chloro - 6 - nitrobenzoselenazole, tetrahydrobenzoselenazole, α-naphthoselenazole, β-naphthoselenazole, nitro group substituted naphthoselenazoles, etc.; a thiazoline nucleus, e.g., thiazoline, 4-methylthiazoline, 4-nitrothiazoline, etc.; a pyridine nucleus, e.g., 2-pyridine, 5-methyl-2-pyridine, 4-pyridine, 3-methyl-4-pyridine, nitro group substituted pyridine, etc.; a quinoline nucleus, e.g., 2-quinoline, 3-methyl - 2 - quinoline, 5-ethyl-2-quinoline, 6-chloro-2-quinoline, 6-nitro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 6-nitro-4-quinoline, 7-methyl-4-quinoline, 8-chloro - 4 - quinoline, 1-isoquinoline, 6-nitro-1-isoquinoline, 3,4-dihydro-1-isoquinoline, 3-isoquinoline, etc.; a 3,3-dialkylindolenine nucleus, preferably having a nitro or cyano substituent, e.g., 3,3-dimethyl-5- or 6-nitroindolenine, 3,3-dimethyl-5- or 6-cyanoindolenine, etc.; and, an imidazole nucleus, e.g., imidazole, 1-alkylimidazole, 1-alkyl-4-phenylimidazole, 1-alkyl - 4,5 - dimethylimidazole, benzimidazole, 1-alkylbenzimidazole, 1-alkyl-5-nitrobenzimidazole, 1-aryl-5,6-dichlorobenzimidazole, 1 - alkyl - α - naphthimidazole, 1-aryl-β-naphthimidazole, 1-alkyl-5-methoxy-α-naphthimidazole, or, an imidazo[4,5-b]quinoxaline nucleus, e.g., 1-alkylimidazo[4,5-b]quinoxaline such as 1-ethylimidazo-[4,5-b]quinoxaline, 6-chloro-1-ethylimidazo[4,5-b]quinoxaline, etc., 1-alkenylimidazo[4,5-b]quinoxaline such as 1-allylimidazo[4,5-b]quinoxaline, 6-chloro - 1 - allylimidazo[4,5-b]quinoxaline, etc., 1-arylimidazo[4,5-b]quinoxaline such as 1-phenylimidazo[4,5-b]quinoxaline, 6-chloro-1-phenylimidazo[4,5-b]quinoxaline, etc.; a 3,3-dialkyl-3H-pyrrolo[2,3-b]pyrido nucleus, e.g., 3,3-dimethyl-3H-pyrrolo[2,3-b]pyridine, 3,3-diethyl - 3H - pyrrolo[2,3-b]pyridine, etc.; a thiazolo[4,5-b]quinoline nucleus; $R_3$ represents an alkyl group, including substituted alkyl (preferably a lower alkyl containing from 1 to 4 carbon atoms), e.g., methyl, ethyl, propyl, isopropyl, butyl, hexyl, cyclohexyl, decyl, dodecyl, etc., and substituted alkyl groups (preferably a substituted lower alkyl containing from 1 to 4 carbon atoms), such as a hydroxyalkyl group, e.g., $\beta$-hydroxyethyl, $\omega$-hydroxybutyl, etc., an alkoxyalkyl group, e.g., $\beta$-methoxyethyl, $\omega$-butoxybutyl, etc., a carboxyalkyl group, e.g., $\beta$-carboxyethyl, $\omega$-carboxybutyl, etc., an alkoxy group, e.g., methoxy, ethoxy, etc., a sulfoalkyl group, e.g., $\beta$-sulfoethyl, $\omega$-sulfobutyl, etc., a sulfatoalkyl group, e.g., $\beta$-sulfatoethyl, $\omega$-sulfatobutyl, etc., an acyloxyalkyl group, e.g., $\beta$-acetoxyethyl, $\gamma$-acetoxypropyl, $\omega$-butyryloxybutyl, etc., an alkoxycarbonyl alkyl group, e.g., $\beta$-methoxycarbonylethyl, $\omega$-ethoxycarbonylbutyl, etc., or an aralkyl group, e.g., benzyl, phenethyl, etc.; an alkenyl group, e.g., allyl, 1-propenyl, 2-butenyl, etc., or an aryl group, e.g., phenyl, tolyl, naphthyl, methoxyphenyl, chlorophenyl, etc.;

n is a positive integer from 1 to 4;
m is a positive integer from 1 to 3;
g is a positive integer from 1 to 2;
L represents a methine linkage, e.g.,

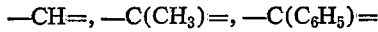

etc.;
$R_2$ and $R_4$ each represent a hydrogen atom, an alkyl group (preferably a lower alkyl containing from 1 to 4 carbon atoms), e.g., methyl, ethyl, propyl, isopropyl, butyl, decyl, dodecyl, etc., or an aryl group, e.g., phenyl, tolyl, naphthyl, methoxyphenyl, chlorophenyl, nitrophenyl, etc.;
X represents an acid anion, e.g., perchlorate, tetrafluoroborate, chloride, bromide, iodide, perchlorate, tetrafluoroborate, sulfamate, thiocyanate, p-toluenesulfonate, methyl sulfate, etc.;
G represents an anilino radical or an aryl radical, e.g., phenyl, naphthyl, dialkylaminophenyl, tolyl, chlorophenyl, nitrophenyl, etc.;
$R_5$ is an alkyleneoxy radical having 1 to 8 carbon atoms in the alkylene chain including an alkylenedioxy radical and an arylenebisalkoxy radical e.g., ethyleneoxy, trimethyleneoxy, tetramethyleneoxy, propylideneoxy, ethylenedioxy, phenylenebisethoxy, etc.;
R represents either (1) an alkyl radical including a substituted alkyl (preferably a lower alkyl having 1 to 4 carbon atoms), e.g., methyl, ethyl, propyl, isopropyl, butyl, hexyl, cyclohexyl, decyl, dodecyl, alkaryl such as benzyl, sulfoalkyl such as $\beta$-sulfoethyl, $\omega$-sulfobutyl, $\omega$-sulfopropyl, or (2) an acyl radical, e.g.,

wherein R is an alkyl including a substituted alkyl or an aryl such as methyl, phenyl, naphthyl, propyl, benzyl, etc.

In the above formulae $Q_2$ preferably completes a pyridine, or a quinoline nucleus. Nuclei wherein $Q_1$, $Q_2$, and $Q_9$ complete an imidazo[4,5-b]quinoxaline nucleus, or a nitro group substituted thiazole, oxazole, selenazole, thiazoline, pyridine, quinoline, 3H-indole, or imidazole nucleus are desensitizing nuclei.

Typical dye crosslinking compounds used in the invention include the following:

(1) 3-ethyl-1'-methoxyoxa-2'-pyridocarbocyanine perchlorate
(2) 1'-ethoxy-3-ethyloxa-2'-pyridocarbocyanine tetrafluoroborate
(3) 3'-ethyl-1-methoxy-2-pyridothiacyanine iodide
(4) 1-ethoxy-3-ethyl-2-pyridothiacyanine tetrafluoroborate
(5) 1-benzyloxy-3'-ethyl-2-pyridothiacyanine iodide
(6) 3'-ethyl-1-methoxy-2-pyridothiacarbocyanine iodide
(7) 1-ethoxy-3'-ethyl-2-pyridothiacarbocyanine tetrafluoroborate
(8) anhydro-3'-ethyl-1-(3-sulfopropoxy)-2-pyridothiacarbocyanine hydroxide
(9) 1-benzyloxy-3'-ethyl-2-pyridothiacarbocyanine perchlorate
(10) 3'-ethyl-1-methoxy-2-pyridothiadicarbocyanine perchlorate
(11) 1'-methoxy-1,3,3-trimethylindo-2'-pyridocarbocyanine picrate
(12) 3'-ethyl-1-methoxy-4',5'-benzo-2-pyridthiacarbocyanine perchlorate
(13) 1-ethoxy-3'-ethyl-4',5'-benzo-2-pyridothiacarbocyanine tetrafluoroborate
(14) 1'-ethoxy-3-ethyloxa-2'-carbocyanine tetrafluoroborate
(15) 1'-ethoxy-3-ethylthia-2'-cyanine tetrafluoroborate
(16) 1'-ethoxy-3-ethylthia-2'-carbocyanine tetrafluoroborate
(17) 1'-ethoxy-3-ethylthia-2'-dicarbocyanine tetrafluoroborate
(18) 1-methoxy-3'methyl-2-pyridothiazolinocarbocyanine perchlorate
(19) 3'-ethyl-1-methoxy-4-pyridothiacyanine perchlorate
(20) 3'-ethyl-1-methoxy-4-pyridothiacarbocyanine perchlorate
(21) 1'-ethoxy-3-ethyl-4,5-benzothia-2'-carbocyanine tetrafluoroborate
(22) 2-$\beta$-anilinovinyl-1-methoxypyridinium-p-toluenesulfonate
(23) 1-ethyl-1'-methoxy-4,5-benzothia-4'-carbocyanine perchlorate
(24) 1-methoxy-2-methylpyridinium p-toluenesulfonate
(25) 1-methoxy-4-methylpyridinium p-toluenesulfonate
(26) anhydro-2-methyl-1-(3-sulfopropoxy) pyridinium hydroxide
(27) 1-ethoxy-2-methylpyridinium tetrafluoroborate
(28) 1-benzyloxy-2-methylpyridinium bromide
(29) 1-ethoxy-2-methylquinolinium tetrafluoroborate
(30) 1,1'-ethylenedioxybispyridinium dibromide
(31) 1,1'-trimethylenedioxybispyridinium dibromide
(32) 1,1'-tetramethylenedioxybis(2-methylpyridinium) dibromide
(33) 1,1'-tetramethylenedioxybis(4-methylpyridinium) dibromide
(34) 1,1'-tetramethylenedioxybispyridinium dibromide
(35) 1,1'-pentamethylenedioxybispyridinium dibromide
(36) 1-acetoxy-2-(4-dimethylaminostyryl)pyridinium perchlorate
(37) 1-benzoyloxy-2-(4-dimethylaminostyryl) pyridinium perchlorate
(38) 1,3-diethyl-5-[(1-methoxy-2(1H)-pyridylidene) ethylidene]-2-thiobarbituric acid
(39) 3-ethyl-5-[(1-methoxy-2(1H)-pyridylidene) ethylidene]rhodanine
(40) 1,3-diethyl-5-[(1methoxy-2(1H)-pyridylidene) ethylidene]barbituric acid
(41) 2-(3,3-dicyanoallylidene)-1-methoxy-1,2-dihydropyridine
(42) 2-[(1-methoxy-2(1H)-pyridylidene)ethylidene] benzo[b]thiophen-3-(2H)-one-1,1-dioxide

(43) 3-cyano-5-[(1-methoxy-2(1H)-pyridylidene) ethylidene]-4-phenyl-2(5H)-furanone The crosslinking agents of this invention can be prepared according to an application, Ser. No. 766,307, filed Oct. 9, 1968, by Jenkins, Heseltine and Mee, titled "Energy-Sensitive Systems," now Pat. No. 3,615,432, issued Oct. 26, 1971.

The dye crosslinking agents described herein are capable of crosslinking any polymer containing hardenable groups. These groups can be side groups pendant from the backbone of the polymer chain or can be in the backbone itself. Also, they can be on the ends of the chain. Polymers having hardenable groups include any polymer which has groups which are capable of being crosslinked when treated with an aldehyde. Such groups include:

(a) A primary amine radical such as —$NH_2$ including amides such as

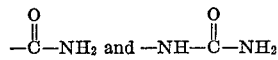

(b) Secondary amine radicals such as —NHR;
(c) Hydroxyl radicals under acidic conditions, e.g., pH under about 2;
(d) Any group containing an active methylene group such as (1) a $\beta$-keto ester, e.g., acetoacetate group or (2) an $\alpha$-cyano ester, e.g., cyanoacetoxy group or (3) a group containing an $\alpha$-diketone moiety such as an acetoacetyl or benzoylacetyl group.

Illustrative polymers include the following:

(1) poly(vinyl alcohol-co-vinyl anthranilate-co-vinyl succinate)
(2) poly(ethylacrylate-co-acrylic acid-co-2-acetoacetoxy-ethyl methacrylate)
(3) poly(methylacrylate-co-sodium-3-acryloyloxy-1-methylpropane-1-sulfonate-co-2-acetoacetoxyethyl acrylate)
(4) poly(methylacrylate-co-acrylic acid-co-2-methacryloyloxyethyl cyanoacetate)
(5) poly(1,2-dimethyl-5-vinylpyridinium methosulfate-co-m-methacryloyl-N'-cyanoacetylhydrazine)
(6) poly(3-acryloyloxypropane-1-sulfonic acid, sodium salt-co-N-methacryloyl-N'-glycylhydrazine)
(7) poly(1,2-dimethyl-5-vinylpyridinium methosulfate-co-2-aminoethyl methacrylate)
(8) poly(acrylamide-co-N-cyanoacetyl-N'-methacryloyl hydrazine)
(9) gelatin
(10) poly(vinylacetoacetate)

The crosslinking agents used in the invention can be activated (decomposed) by various forms of energy such as (1) electromagnetic radiation including ultraviolet, visible and infrared light, X-rays, electron beams, laser beams, (2) heat, (3) pressure, etc. When a mixture of polymer having hardenable groups and crosslinking agent is exposed to one of these forms of energy, the initiator decomposes producing an aldehyde and a dye base. The aldehyde reacts with the hardenable groups to join two different polymer chains together by crosslinks forming a composition having increased viscosity. Of course, the initiator used desirably has maximum absorption in the same regions as the activating radiation. The relative proportions of the polymeric material and the crosslinking agent can be varied as desired or as conditions may require, but ordinarily the proportions thereof in the mixture will be at least about 0.1% and generally within a range such that 0.1 to 10% by weight of the aldehyde produced on fragmenting the original compound will be present after its decomposition, and preferably 1.0 to 7.0% by weight of such aldehyde in the total composition (including polymer and original compound).

The preferred sources of energy include visible light and electron beams. Strong light is not necessary, a 150 watt xenon arc lamp at a distance of less than a foot being very suitable since at relatively low intensities the photochemical crosslinking influence of the initiators of this invention is sufficiently strong. When electron beams are used, the intensity of the beams can range from 1 kv. to 100 kv. with 15 kv. generally being sufficient.

The time of exposure is not critical but is somewhat dependent upon the amount of crosslinking agent present and the intensity of the light source. Relatively large amounts of crosslinking agent and strong light sources require shorter times of exposure. Periods for exposure can range from a fraction of a second to several hours. However, for most applications 1 second to 1 hour is sufficient.

The crosslinkable compositions of this invention are useful in the reproduction of images in that their exposure to light or other forms of energy can cause insolubilization of the crosslinking composition. Thus, when a layer of one of these compositions, initially soluble, is applied to a support and exposed photographically, the exposed areas become insoluble.

The invention is useful for the formation of elements wholly made from these compositions. The present invention also makes possible the formation of coated printing films on any base by the deposition or coating by conventional means of films or coatings of the subject novel crosslinkable compositions. Typical bases or supports are metal sheets (e.g., copper, aluminum, zinc and magnesium), paper, glass, cellulose acetate butyrate film, cellulose acetate film, poly(vinyl acetal) film, polystyrene film, polycarbonate film, poly(ethylene terephthalate) film, polyethylene-coated paper, nylon and metal screens.

The base or support is typically coated with a solution of the polymeric material in a suitable solvent, this solution containing dissolved or homogeneously dispersed therein, an energy-sensitive crosslinking initiator as described hereinabove whereupon the solvent or solvent mixture is eliminated by known means such as evaporation, leaving a coating of the photosensitive mixture upon the base or support. Thereafter, the dried photosensitive coating can be imagewise exposed to actinic light rays or other suitable energy source.

When the support material carrying the photosensitive composition is light-reflecting, there can be present, e.g., superimposed on said support and adherent thereto or in the surface thereof, a layer or stratum absorptive of actinic light in order to minimize reflectance from the combined support of incident actinic light.

If the crosslinkable composition is water-soluble, water can be used as the solvent in coating the support. If water-insoluble compositions are used, organic solvents, mixtures of organic solvents or mixtures of organic solvents and water can be used. Suitable solvents can be readily ascertained by one skilled in the art.

The elements formed wholly of or coated with the photosensitive composition are useful in photography, photomechanical reproduction processes, lithography and intaglio printing. More specific examples of such uses are offset printing, silk screen printing, duplicating pads, manifold stencil sheeting coatings, lithographic plates, relief plates, and gravure plates. The term "printing plates" as used herein is inclusive of all of these.

A specific application of the invention is illustrated by a typical preparation of a printing plate. In this application a plate, usually of metal, is coated with a film of the crosslinkable composition. Alternatively, any suitable support can be coated with a film of the composition. The surface of the plate is then exposed to visible light through a transparency, e.g., a positive or negative (consisting of opaque and transparent areas). The light induces the decomposition of the crosslinking agent to a dye base and an aldehyde, and the aldehyde in turn crosslinks the polymer in the areas of the surface beneath the transparent portions of the image causing these portions to become insoluble, whereas the areas beneath the opaque portions of the image retain their pre-exposure solubility. The soluble areas of the surface are then removed by a solvent, and the insoluble, raised portions of the film which remain serve as a resist image, wherein a relief plate is formed by etching the exposed base material. The plate carrying the insolubilized raised portion, i.e., the relief image, can also be inked and used as a relief printing plate directly in the customary manner.

The thickness of the photosensitive layer is a direct function of the thickness desired in the relief image and this will depend on the subject being reproduced and particularly on the extent of the non-printing areas. In the case of half-tones the screen used is also a factor. In general, the thickness of the photosensitive layer may vary from 0.001 mm. to 7 mm. Layers ranging from 0.001 to 0.70 mm. in thickness may be used for half-tone plates. Layers ranging from about 0.05 to about 1.50 mm. in thickness will be used for the majority of letterpress printing plates, including those wherein half-tone and line images are to be combined.

The solvent liquid used for washing or "developing" the printing plates made from the photosensitive composition should have good solvent action on the unexposed areas, yet have little action on the hardened image or upon the base material, the antihalation layer, or the subbing layer with which the photosensitive composition may be anchored to the support.

The crosslinkable compositions of the invention show many advantages over the known photosensitive compositions. These compositions can be crosslinked by exposure to any form of light or other energy source simply by selecting a crosslinking agent which is sensitive to the particular form of energy employed. For example, the dye crosslinking agents can be made to have maximum light adsorption over wide portions of the visible spectrum facilitating several types of exposing means. Mixtures of such dyes can also be used to facilitate image-wise exposing.

The photosensitive crosslinking compositions are suitable for other purposes in addition to the printing uses described above, e.g., as ornamental plaques or for producing ornamental effects; as patterns for automatic engraving machines, foundry molds, cutting and stamping dies, name stamps, relief maps for braille, as rapid cure coatings, e.g., on film base; for the production of sound tracks on film; for embossing plates, paper, etc.; and in the preparation of printed circuits.

The following examples are included for a further understanding of the invention.

EXAMPLE 1

A composition containing gelatin and Compound 24 in an amount sufficient to produce 3.0% aldehyde by weight of the total composition is coated on a poly(ethylene terephthalate) film support at a thickness of $6\mu$. The element is exposed to a transparency having opaque and transparent areas with a 140 watt ultraviolet lamp placed 3 inches away from the surface of element causing crosslinking to occur in the exposed areas. After exposure, the element is washed with water. The unexposed areas wash off leaving only an image formed by the exposed hardened areas. This procedure is repeated for Compounds 22, 25, 26, 27, 29, 32 and 33 and similar results are obtained.

EXAMPLE 2

Example 1 is repeated except varying amounts of Compound 24 are employed to show the effect on crosslinking for different concentrations of crosslinking agent. The elements are swollen by immersing them in water for 3 minutes. The extent of swelling or percent swell is an indication of the amount of crosslinking which has occurred, smaller amounts of swelling being indicative of greater amounts of crosslinking. The results are set forth in Table I below.

TABLE I

| Compound number: | Percent Relative to dry vehicle | Swell |
|---|---|---|
| Blank | 0 | 580 |
| 32 | 1 | 302 |
| 32 | 2 | 265 |
| 32 | 6 | 85 |

EXAMPLE 3

Example 1 is repeated except Compound 34 is used in place of 24 and poly(vinylacetoacetate) is used as the vehicle in place of gelatin. After washing with water, a good relief image is obtained.

EXAMPLE 4

This example illustrates the preparation of a lithographic plate. Compound 24 is mixed with gelatin at a level calculated to produce theoretically 6% of formaldehyde with respect to dry weight of gelatin. The composition is coated on an anodized aluminum sheet at a thickness of 0.002 in. The dried coating is exposed for 15 minutes to the light from a 140 watt Hanovia ultraviolet lamp through a definition chart. The exposed plate is washed with 85° F. water for 10 minutes and dried. The sheet is placed on a lithographic printing press and a good press copy is obtained.

EXAMPLE 5

The crosslinkable compositions of this invention are also useful in simple transfer processes. A coating of compound 24 (calculated to produce 6% formaldehyde) in gelatin is coated on a fluorinated hydrocarbon resin film ("Teflon") support at a thickness of 0.004 in. The dried material is exposed, as above, through an appropriate negative. The exposed sample is dipped in a warm, silver nitrate-urea solution. The sample is removed from the solution and placed in contact with a Verifax receiving sheet, separated, and the transferred image is developed in Kodak D72 Developer. A good reproduction of the original is obtained.

EXAMPLE 6

Production of dye mordants with
simultaneous hardening

Compounds with ionic or cationic groups attached, when fragmented by energy, produce an aldehyde with a potential mordanting group. A gelatin silver halide emulsion coating containing Compound 26 is prepared so that 3% of the propionaldehyde-3-sulfonic acid would be expected if 100% reaction occurred. The coating is exposed through a mask with the emulsion side toward a 150 watt xenon arc lamp placed within 1 inch of the opening in the lamp housing. The test pattern is cooled with a stream of nitrogen during a 95 min. exposure. The 1¾ inch square test strip is hardened in a 2% succinaldehyde prehardening bath for 1 min. and rinsed under a flow of distilled water at 26° C. for 15 min. The test square is then dyed with a solution of methylene blue prepared by placing 0.1 g. of methylene blue in 10 ml. of water, slurrying for 10 min. and filtering. A definite mordanting is noted in the exposed areas. The strip upon standing in distilled water overnight at room temperature, retains the dyeing of the exposed area.

EXAMPLE 7

A 4½ by 6½ in. coating of poly(vinylacetoacetate) on Estar is prepared containing an amount of Compound 33, such that if complete reaction occurred, 6% succinaldehyde, with respect to dry polymer, would be expected. This coating is exposed through the Estar base using a combined definition chart, resolution chart, and step wedge coating on glass for 5 hr. and 5 min. (The reason for this long exposure time is that the glass and film base combined present an optical density of 2500–2700 A. in excess of 8.0.) The coating is then dyed for 10–15 sec. in a 10% solution of 1,8-dihydroxy-2-(6,8-disulfonaphthyl-2-azo)-3,6-disulfonaphthalene, tetra sodium salt, washed with running water, first at 85° F., and then at 91° F. for a total of 20 min. Dyeing occurs preferentially in the exposed areas substantiating a mordanting effect.

EXAMPLE 8

Example 7 is repeated except the crosslinking agent employed is Compound 32 and the dye used is 1,5-disulfomethylamino - 3,7 - disulfo-4,8 - dihydroxyanthraquinone tetrasodium salt. Similar results are obtained.

EXAMPLE 9

Direct electron recording

Energy other than light can be used to produce fragmentation of the novel crosslinking agents of this invention. A set of strips is coated with a composition containing gelatin and sufficient amounts of crosslinking agent to produce 6% aldehyde relative to the dry vehicle. The crosslinking agents employed are Compounds 24, 32, and 33. The strips are then subjected to a graded series of exposures to 15 kilovolt electrons. The strips are then washed with water and inspected for differential hardening. Each of the strips contained hardened areas.

EXAMPLE 10

In order to determine the mordanting effect, each of the exposed strips are bathed in the dye solution used in Example 7. Dyeing occurs preferentially in the exposed areas. When the dye strips are placed in distilled water overnight, the dye is not removed.

The invention has been described in detail with particular reference to certain preferred embodiments thereof, but it will be understood that variations and modifications can be effected within the spirit and scope of the invention as described hereinabove and as defined in the appended claims.

We claim:

1. A crosslinkable composition comprising an aldehyde crosslinkable polymer having hardenable groups chosen from the class consisting of a primary amine radical and an active methylene group chosen from the class consisting of a β-keto ester, an α-cyano ester, and a group containing an α-diketone moiety and a crosslinking agent capable of being activated by heat, pressure or radiation having a formula selected from the group consisting of

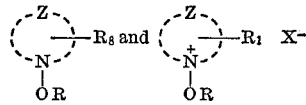

wherein:
(A) $R_1$ is selected from the group consisting of:
   (a) a methine linkage terminated by a heterocyclic nucleus of the type contained in cyanine dyes,
   (b) an anilinovinyl radical, and
   (c) a styryl radical;
(B) R is selected from the group consisting of:
   (a) an alkyl radical having from 1 to 8 carbon atoms and
   (b) an acyl radical

in which $R_6$ is an alkyl radical having from 1 to 8 carbon atoms or an aryl radical selected from the class consisting of phenyl and naphthyl radicals;

(C) $R_8$ is selected from the group consisting of:
   (a) a methine linkage terminated by a heterocyclic nucleus of the type contained in merocyanine dyes and;
   (b) an allylidene radical;
(D) X is an acid anion; and,
(E) Z represents the non-metallic atoms necessary to complete a 5 to 6 membered heterocyclic nucleus composed of carbon atoms and at least one element selected from the group consisting of oxygen, sulfur, selenium and nitrogen atoms.

2. The crosslinkable composition of claim 1 wherein Z represents the atoms necessary to complete a member selected from the group consisting of a pyridine nucleus and a quinoline nucleus.

3. The crosslinkable composition of claim 1 wherein $R_1$ is a methine linkage terminated by a 5 to 6 membered heterocyclic nucleus having at least one hetero nitrogen atom.

4. A crosslinkable composition comprising an aldehyde crosslinkable polymer having hardenable groups chosen from the class consisting of a primary amine radical and an active methylene group chosen from the class consisting of a β-ketone ester, an α-cyano ester, and a group containing an α-diketone moiety and a crosslinking agent capable of being activated by heat, pressure or radiation having the formula:

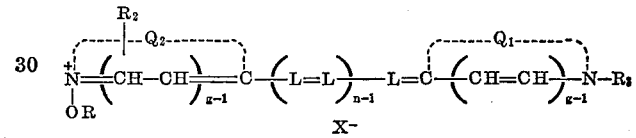

wherein:
(A) $Q_1$ and $Q_2$ each represent the nonmetallic atoms necessary to complete a 5 to 6 membered heterocyclic nucleus;
(B) R is selected from the group consisting of:
   (a) an alkyl radical having from 1 to 8 carbon atoms and
   (b) an acyl radical

in which $R_6$ is an alkyl radical having from 1 to 8 carbon atoms or an aryl radical selected from the class consisting of phenyl and naphthyl radicals;
(C) $R_2$ is selected from the group consisting of:
   (a) an aryl radical,
   (b) a hydrogen atom, and
   (c) an alkyl radical;
(D) L is a methine linkage;
(E) X is an acid anion;
(F) $g$ is a positive integer from 1 to 2;
(G) $n$ is a positive integer from 1 to 4; and
(H) $R_3$ is selected from the group consisting of an alkyl radical, an alkenyl radical, an aryl radical and an alkoxy radical.

5. The crosslinkable composition of claim 4 wherein $Q_2$ represents the atoms necessary to complete a member selected from the group consisting of a pyridine nucleus and a quinoline nucleus.

6. A crosslinkable composition comprising an aldehyde crosslinkable polymer having hardenable groups chosen from the class consisting of a primary amine radical and an active methylene group chosen from the class consisting of a β-keto ester, an α-cyano ester, and a group containing an α-diketone moiety and a crosslinking agent capable of being activated by heat, pressure or radiation having the formula:

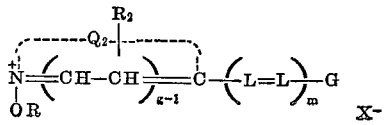

wherein:
(A) $Q_2$ represents the non-metallic atoms necessary to complete a 5 to 6 membered heterocyclic nucleus;
(B) R is selected from the group consisting of:
(a) an alkyl radical having from 1 to 8 carbon atoms and
(b) an acyl radical

in which $R_6$ is an alkyl radical having from 1 to 8 carbon atoms or an aryl radical selected from the class consisting of phenyl and naphthyl radicals;
(C) $R_2$ is selected from the group consisting of:
(a) an aryl radical;
(b) a hydrogen atom, and
(c) an alkyl radical;
(D) L is a methine linkage;
(E) X is an acid anion;
(F) G is selected from the group consisting of an anilinovinyl radical and an aryl radical;
(G) $m$ is a positive integer from 1–3; and
(H) $g$ is a positive integer from 1–2.

7. The crosslinkable composition of claim 6 wherein $Q_2$ represents the atoms necessary to complete a member selected from the group consisting of a pyridine nucleus and a quinoline nucleus.

8. A crosslinkable composition comprising an aldehyde crosslinkable polymer having hardenable groups chosen from the class consisting of a primary amine radical and an active methylene group chosen from the class consisting of a β-keto ester, an α-cyano ester, and a group containing an α-diketone moiety and a crosslinking agent capable of being activated by heat, pressure or radiation having the formula:

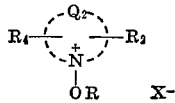

wherein:
(A) $Q_2$ represents the nonmetallic atoms necessary to complete a 5 to 6 membered heterocyclic nucleus composed of carbon atoms and at least one element selected from the group consisting of oxygen, sulfur, selenium and nitrogen atoms;
(B) R is an acyl radical

in which $R_6$ is an alkyl radical having from 1 to 8 carbon atoms or an aryl radical selected from the class consisting of phenyl and naphthyl radicals;
(C) $R_2$ and $R_4$ are each seletced from the group consisting of an aryl radical, a hydrogen atom and an alkyl radical; and
(D) X is an acid anion.

9. The crosslinkable composition of claim 8 wherein $Q_2$ and $Q_9$ each represent the atoms necessary to complete a member selected from the group consisting of a pyridine nucleus and a quinoline nucleus.

10. A crosslinkable composition comprising an aldehyde crosslinkable polymer having hardenable groups chosen from the class consisting of a primary amine radical and an active methylene group chosen from the class consisting of a β-keto ester, an α-cyano ester, and a group containing an α-diketone moiety and a crosslinking agent capable of being activated by heat, pressure or radiation having a formula selected from the group consisting of:

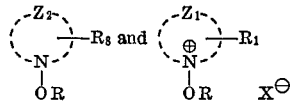

wherein:
(A) R is selected from the group consisting of:
(a) an alkyl radical having from 1 to 8 carbon atoms and
(b) an acyl radical

in which $R_6$ is an alkyl radical having from 1 to 8 carbon atoms or an aryl radical selected from the class consisting of phenyl and naphthyl radicals;
(B) $Z_1$ represents the atoms necessary to complete a pyridinium ring;
(C) $Z_2$ represents the atoms necessary to complete a pyridylidene ring;
(D) $R_1$ is a 2 or 4 position pyridinium ring substituent selected from the group consisting of:
(a) a methine linkage terminated by a heterocyclic nucleus of the type contained in cyanine dyes,
(b) an anilinovinyl radical, and
(c) a styryl radical;
(E) $R_8$ is a 2 or 4 position pyridine ring substituent selected from the group consisting of:
(a) a methine linkage terminated by a heterocyclic nucleus of the type contained in merocyanine dyes and
(b) an allylidene radical; and
(F) X is an acid anion.

11. A crosslinkable composition comprising an aldehyde crosslinkable polymer having hardenable groups chosen from the class consisting of a primary amine radical and an active methylene group chosen from the class consisting of a β-keto ester, an α-cyano ester, and a group containing an α-diketone moiety and a crosslinking agent capable of being activated by heat, pressure or radiation, having the formula

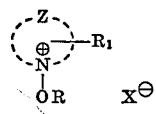

wherein:
(A) R is selected from the group consisting of:
(a) an alkyl radical having from 1 to 8 carbon atoms and
(b) an acyl radical

in which $R_6$ is an alkyl radical having from 1 to 8 carbon atoms or an aryl radical selected from the class consisting of phenyl and naphthyl radicals;
(B) Z represents the atoms necessary to complete a quinolinium ring;
(C) $R_1$ is a quinolinium nucleus substituent selected from the group consisting of:
(a) a methine linkage terminated by a heterocyclic nucleus of the type contained in cyanine dyes,
(b) an anilinovinyl radical, and
(c) a styryl radical;
(D) X is an acid anion.

12. A crosslinkable composition comprising an aldehyde crosslinkable polymer which contains active methylene groups chosen from the group consisting of a β-keto ester, an α-cyano ester, and a group containing an α-diketone moiety and a crosslinking agent capable of being activated by heat, pressure, or radiation having a formula selected from the group consisting of:

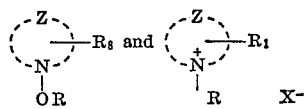

wherein:
(A) $R_1$ is selected from the group consisting of:
   (a) a methine linkage terminated by a heterocyclic nucleus of the type contained in cyanine dyes,
   (b) an alkyl radical,
   (c) an anilinovinyl radical,
   (d) a hydrogen atom,
   (e) an aryl radical,
   (f) an aldehyde group and
   (g) a styryl radical;
(B) R is selected from the group consisting of:
   (a) an alkyl radical having from 1 to 8 carbon atoms and
   (b) an acyl radical

in which $R_6$ is an alkyl radical having from 1 to 8 carbon atoms or an aryl radical selected from the class consisting of phenyl and naphthyl radicals;
(C) $R_8$ is selected from the group consisting of:
   (a) a methine linkage terminated by a heterocyclic nucleus of the type contained in merocyanine dyes and;
   (b) an allylidene radical;
(D) X is an acid anion; and
(E) Z represents the non-metallic atoms necessary to complete a 5 or 6 membered heterocyclic nucleus composed of carbon atoms and at least one element selected from the group consisting of oxygen, sulfur, selenium and nitrogen atoms.

13. A crosslinkable composition according to claim 1 in which said aldehyde crosslinkable polymer is gelatin.

14. A crosslinkable composition comprising an aldehyde crosslinkable polymer having hardenable groups chosen from the class consisting of polymers containing primary amine radicals or active methylene groups chosen from the group consisting of a $\beta$-keto ester, an $\alpha$-cyano ester, and a group containing an $\alpha$-diketone moiety and a crosslinking agent capable of being activated by heat, pressure or radiation having a formula selected from the group consisting of:

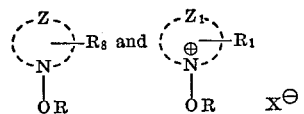

wherein:
(A) R is selected from the group consisting of:
   (a) an alkyl radical having from 1 to 8 carbon atoms and
   (b) an acyl radical

in which $R_6$ is an alkyl radical having from 1 to 8 carbon atoms or aryl radical selected from the class consisting of phenyl and naphthyl radicals;

(B) $Z_1$ represents the atoms necessary to complete a pyridinium ring;
(C) $Z_2$ represents the atoms necessary to complete a pyridylidene ring;
(D) $R_1$ is a 2 or 4 position pyridinium ring substituent selected from the group consisting of:
   (a) a methine linkage terminated by a heterocyclic nucleus of the type contained in cyanine dyes,
   (b) an anilinovinyl radical,
   (c) an aryl radical chosen from the class consisting of phenyl and naphthyl radicals,
   (d) a styryl radical;
(E) $R_8$ is a 2 or 4 position pyridine ring substituent selected from the group consisting of:
   (a) a methine linkage terminated by a heterocyclic nucleus of the type contained in merocyanine dyes and
   (b) an allylidene radical; and
(F) X is an acid anion.

15. A crosslinkable composition comprising an aldehyde crosslinkable polymer having hardenable groups chosen from the class consisting of polymers containing primary amine radicals or active methylene groups chosen from the group consisting of a $\beta$-keto ester, an $\alpha$-cyano ester, and a group containing an $\alpha$-diketone moiety and a crosslinking agent capable of being activated by heat, pressure or radiation having the formula

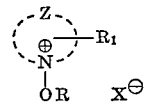

wherein:
(A) R is selected from the group consisting of:
   (a) an alkyl radical having from 1 to 8 carbon atoms and
   (b) an acyl radical

in which $R_6$ is an alkyl radical having from 1 to 8 carbon atoms or an aryl radical selected from the class consisting of phenyl and naphthyl radicals;
(B) Z represents the atoms necessary to complete a quinolinium ring;
(C) $R_1$ is a quinolinium nucleus substituent selected from the group consisting of:
   (a) a methine linkage terminated by a heterocyclic nucleus of the type contained in cyanine dyes,
   (b) an anilinovinyl radical,
   (c) an aryl radical chosen from the class consisting of phenyl and naphthyl radicals, and
   (d) a styryl radical;
(D) X is an acid anion.

References Cited
UNITED STATES PATENTS

| | | | |
|---|---|---|---|
| 3,582,342 | 6/1971 | Itano | 96—90 |
| 3,532,499 | 10/1970 | Willems | 96—95 |
| 3,615,453 | 10/1971 | Jenkins et al. | 96—115 R |

THEODORE MORRIS, Primary Examiner

U.S. Cl. X.R.

96—35.1, 111; 260—30.2